(12) United States Patent  
Yoshida

(10) Patent No.: US 9,117,352 B2
(45) Date of Patent: Aug. 25, 2015

(54) ELECTRONIC DEVICE

(71) Applicant: JVCKENWOOD CORPORATION, Yokohama-shi (JP)

(72) Inventor: Takashi Yoshida, Tokyo (JP)

(73) Assignee: JVCKENWOOD CORPORATION (JP)

( * ) Notice: Subject to any disclaimer, the term of this patent is extended or adjusted under 35 U.S.C. 154(b) by 254 days.

(21) Appl. No.: 13/855,829

(22) Filed: Apr. 3, 2013

(65) Prior Publication Data

US 2013/0285811 A1 Oct. 31, 2013

(30) Foreign Application Priority Data

Apr. 27, 2012 (JP) .................... 2012-104022

(51) Int. Cl.
  *G08B 13/14* (2006.01)
  *G01C 21/36* (2006.01)
  *G08B 13/00* (2006.01)

(52) U.S. Cl.
  CPC ........ *G08B 13/1427* (2013.01); *G01C 21/3688* (2013.01); *G08B 13/149* (2013.01); *G08B 13/00* (2013.01); *G08B 13/1418* (2013.01)

(58) Field of Classification Search
  CPC .. G01C 21/3688; G08B 13/00; G08B 13/149; G08B 13/1418; H04B 2001/084
  USPC ........ 180/287, 289; 340/547, 568.1, 571, 687
  See application file for complete search history.

(56) References Cited

U.S. PATENT DOCUMENTS 5,554,966 A * 9/1996 Iijima et al. .................. 340/687
7,660,103 B2 * 2/2010 Ozaki ...................... 361/679.02
2009/0201433 A1 * 8/2009 Hayashi ........................ 348/837

FOREIGN PATENT DOCUMENTS

JP 2004288993 10/2004

* cited by examiner

*Primary Examiner* — Ariel Balaoing
*Assistant Examiner* — Benyam Haile
(74) *Attorney, Agent, or Firm* — Cantor Colburn LLP

(57) ABSTRACT

Provided is an electronic device having a high anti-theft effect with a simple structure. The electronic device includes: a fixed panel; a detachable panel which is attached to or detached from the fixed panel; a first sensor which detects detaching of the detachable panel from the fixed panel; and a second sensor which detects detaching of the detachable panel from the fixed panel. A controller (CPU) restricts some of the plurality of functions when at least one of the first sensor and the second sensor detects that the detachable panel is detached from the fixed panel.

17 Claims, 17 Drawing Sheets

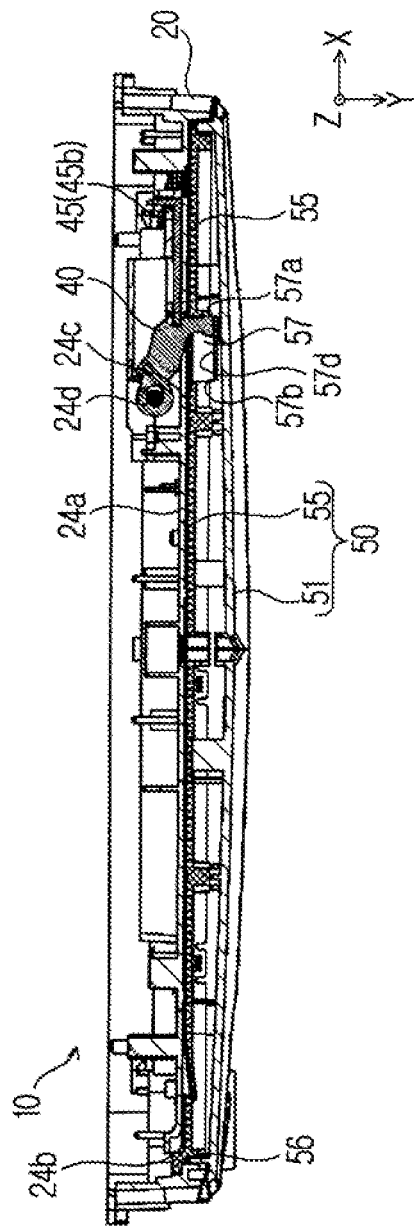

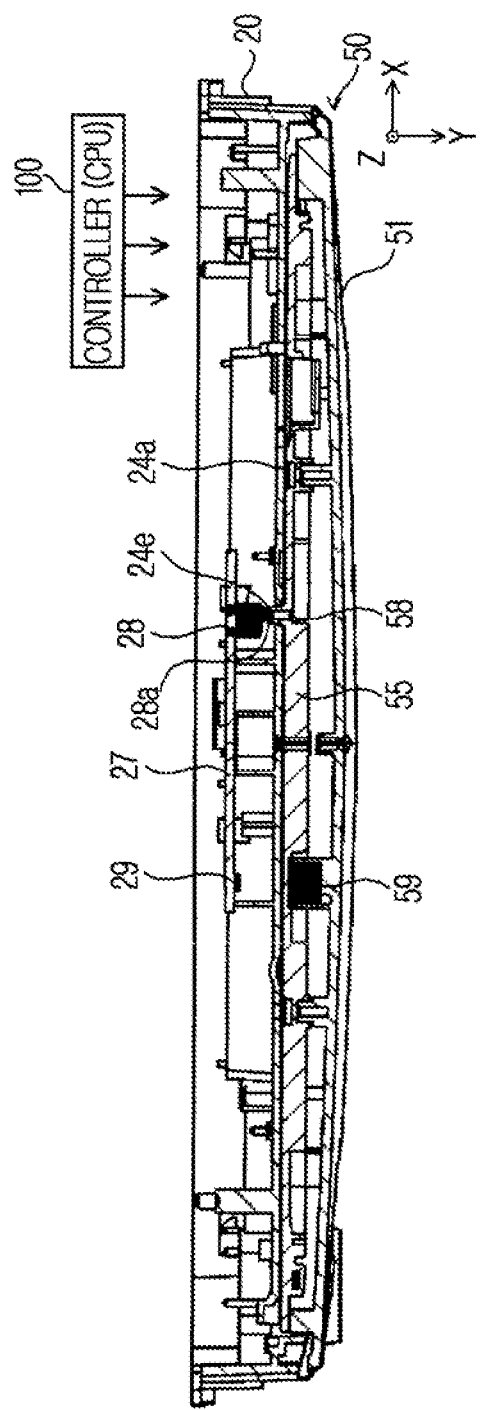

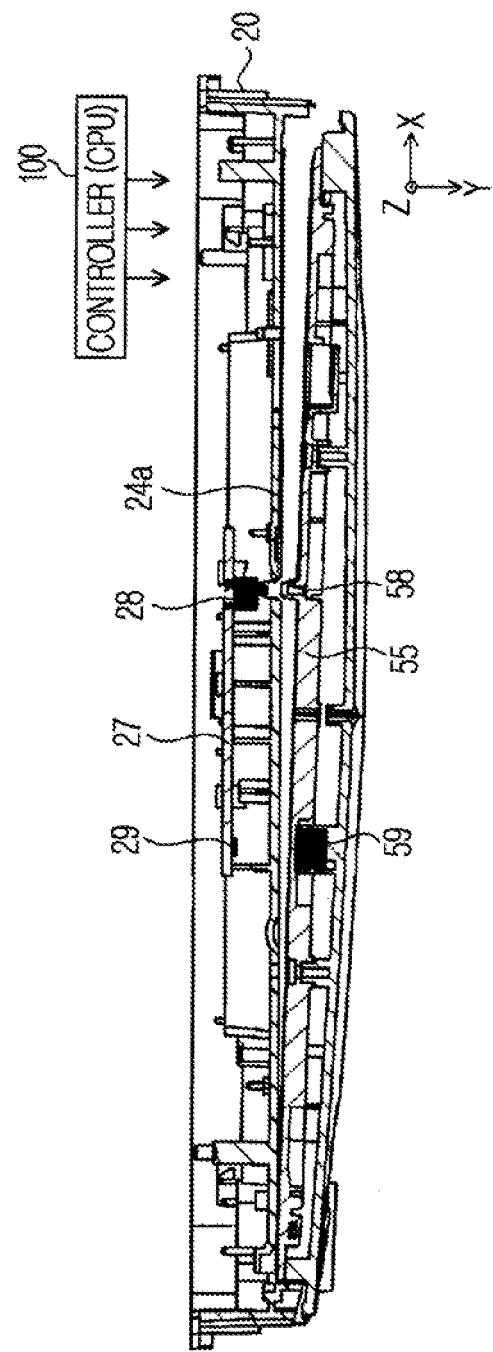

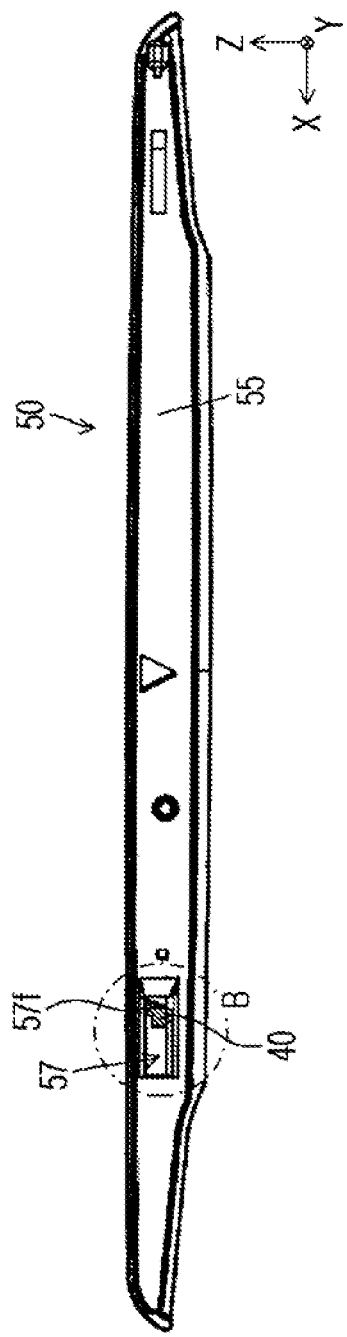

ELECTRONIC DEVICE

CROSS-REFERENCE TO RELATED PATENT APPLICATIONS

This application claims the benefit of Japanese Patent Application No. 2012-104022, filed on Apr. 27, 2012, in the Japan Patent Office, the disclosure of which is incorporated herein in its entirety by reference.

BACKGROUND OF THE INVENTION

1. Field of the Invention

The present invention relates to an electronic device.

2. Description of the Related Art

Electronic devices including a sensor for preventing theft have been provided. For example, an electronic device including a magnetic sensor, which is attached to an installation surface having a magnet, is well known in the art. When such an electronic device is detached from the installation surface and a magnetic force detected by the magnetic sensor is equal to or less than a predetermined value, transmission/receipt operations are restricted by a controller (for example, Patent Reference 1).

Also, for anti-theft performance, for example, a part of an electronic device may be detachable, and when the corresponding part is detached, operations of the electronic device can be restricted. In such an electronic device, attaching/detaching of a part of the electronic device may be preferably performed in a simple and easy manner.

PRIOR ART REFERENCE (Patent Reference 1) Japanese Laid-open Patent Publication No. 2004-288993

SUMMARY OF THE INVENTION

The present invention provides an electronic device having a high anti-theft effect with a simple configuration.

According to an aspect of the present invention, there is provided an electronic device having a plurality of functions, the electronic device including: a fixed panel; a detachable panel which is attached to or detached from the fixed panel; a first sensor which detects detaching of the detachable panel from the fixed panel; a second sensor which detects detaching of the detachable panel from the fixed panel; and a controller which restricts some of the plurality of functions when at least one of the first sensor and the second sensor detects that the detachable panel is detached from the fixed panel.

BRIEF DESCRIPTION OF THE DRAWINGS

The above and other features and advantages of the present invention will become more apparent by describing in detail exemplary embodiments thereof with reference to the attached drawings in which:

FIG. 2A is a cross-sectional view of the car navigation device according to a first embodiment of the present invention taken along line II-II of FIG. 1A;

FIG. 3B is a cross-sectional view of the car navigation device in the state of FIG. 3A taken along line III-III of FIG. 1A;

FIG. 4B is a cross-sectional view of the car navigation system in the state shown in FIG. 4B taken along line III-III of FIG. 1A;

FIG. 10A is a schematic diagram showing a rear surface of the detachable panel and the lever in the car navigation device according to the second embodiment of the present invention.

DETAILED DESCRIPTION OF THE INVENTION

Hereinafter, an electronic device according to embodiments of the present invention will be described with an example of a car navigation device.

First Embodiment

Figure 1A:
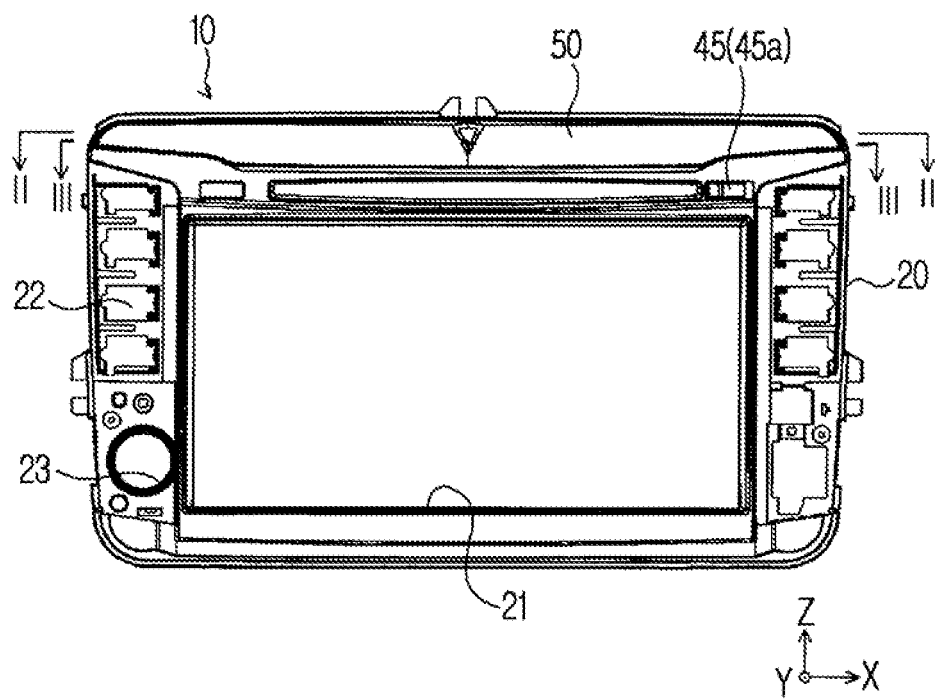
FIG. 1A is a front view of a car navigation device according to an embodiment of the present invention.
Figure 1B:
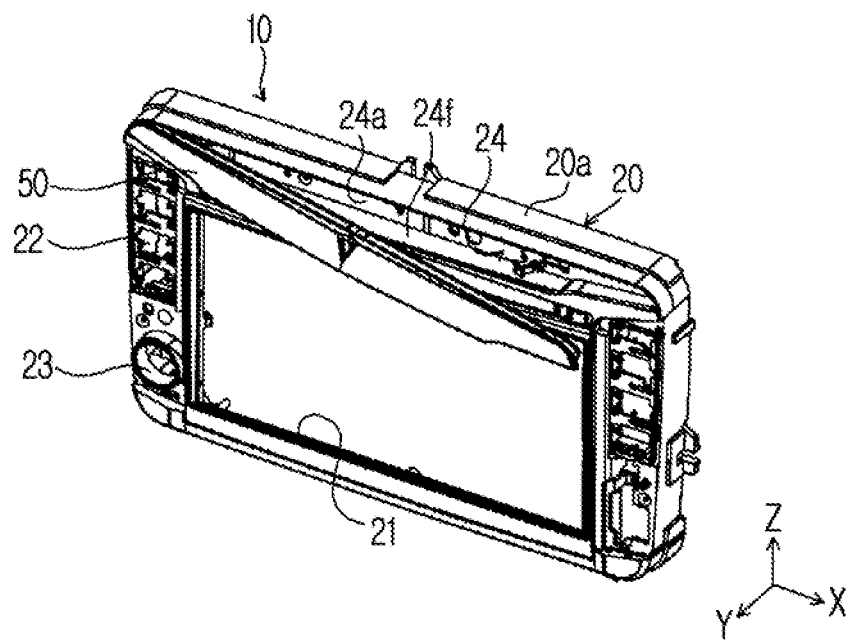
FIG. 1B is a perspective view of the car navigation device FIG. 1A in a state where a detaching panel is detached.

A car navigation device 10 according to an embodiment of the present invention has an outer appearance of about rectangular parallelepiped, as shown in FIGS. 1A and 1B, and is provided on a console panel of a car to be used. In addition, for convenience of comprehension, as shown in FIG. 1B, a lengthwise direction of an upper surface 20a of a fixed panel 20 is defined as an X-axis direction, a direction perpendicular to the X-axis direction of the upper surface 20a is defined as a Y-axis direction, and a direction perpendicular to the X and Y-axis directions is defined as a Z-axis direction.

The car navigation device 10 is characterized in that functions of the car navigation device 10 are restricted when a detachable panel 50 is detached. Thus, hereinafter, a detaching structure of the detachable panel 50, a detaching detecting mechanism of the detachable panel 50, a system configuration of the car navigation device 10, and operations of the car navigation device 10 will be described in the stated order.

First, the detaching structure of the detachable panel 50 will be described below.

As shown in FIGS. 1A and 1B, the car navigation device 10 has the fixed panel 20 having an approximately rectangular parallelepiped shape, and the detachable panel 50 that is configured to be attached to/detached from the fixed panel 20.

The fixed panel 20 includes a display panel attaching unit 21, a manipulation button attaching unit 22, and a manipulation handle attaching unit 23 on a front portion thereof. A display unit 102 that will be described later is disposed on the display panel attaching unit 21 so as to display maps and various messages. In addition, various manipulation buttons and a manipulation handle are respectively provided on the manipulation button attaching unit 22 and the manipulation handle attaching unit 23 so as to input instructions of a user to the car navigation device 10.

A detachable panel attaching unit 24 that is thin and a long space in the X-axis direction and has a back plate 24a at a rear portion thereof and a partition plate 24f on a lower portion thereof is formed on an upper portion of the display panel attaching unit 21 in the fixed panel 20.

As shown at a left side of FIG. 2A, a slit 24b through which an engaging unit 56 of the detachable panel 50 that will be described later passes is formed in the back plate 24a of the fixed panel 20. Also, as shown at a right side of FIG. 2A, a hole 24c with a rectangular shape, through which a lever 40 that will be described later passes, is formed in the back plate 24a of the fixed panel 20. In addition, a rotary shaft 24d supporting the lever 40 is provided around the hole 24c and at a rear portion of the back plate 24a in the Z-axis direction. Also, as shown in FIG. 2A, the fixed panel 20 includes the lever 40 and a slider 45.

The lever 40 is a member for holding a state where the detachable panel 50 is attached to the fixed panel 20.

Figure 2B:
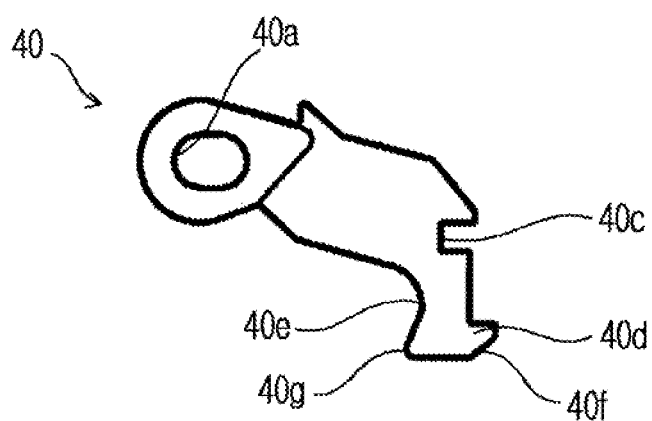
FIG. 2B is an enlarged view of a lever of FIG. 2A.

As shown in FIG. 2B, the lever 40 includes an elongated hole 40a, a slider holding portion 40c, a hook portion 40d, an inner lid holding portion 40e, a tapered portion 40f, and an apex portion 40g.

Figure 3A:
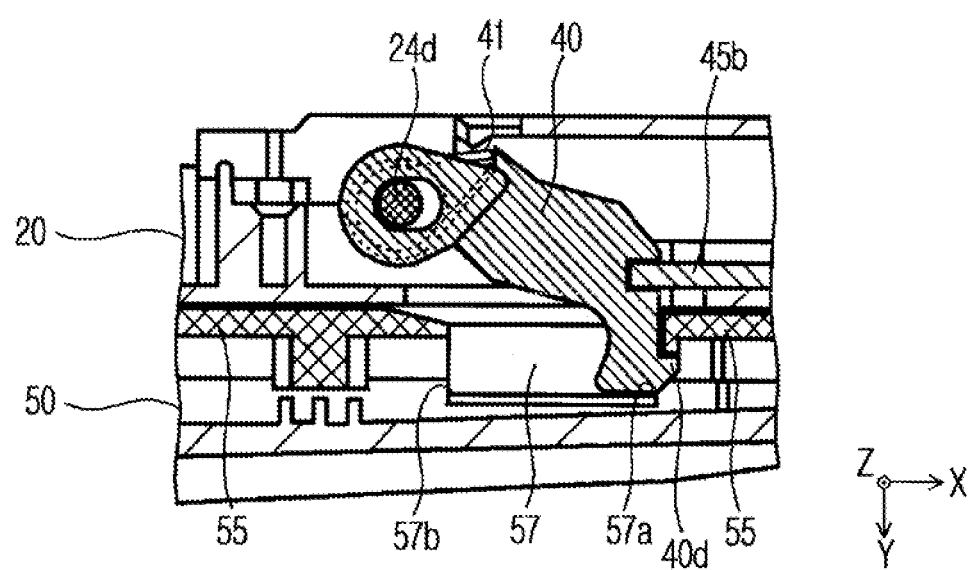
FIG. 3A is an enlarged view of a part around the lever when a detaching panel is held by the lever, in the car navigation device according to the first embodiment of the present invention.

As shown in FIG. 3A, the lever 40 is provided on the fixed panel 20 in states of being movable to left and right sides of FIG. 3A and being rotatable based on the rotary shaft 24d by inserting the rotary shaft 24d through the elongated hole 40a. Also, the lever 40 is elastically supported by a twisted coil spring 41 to a right side of FIG. 3A, that is, in +X-axis direction, so as to rotate in a clockwise direction based on the rotary shaft 24d in FIG. 3A.

The slider holding portion 40c is formed as a concave portion that is engaged with a part of a slider that will be described later. The hook portion 40d is a hook engaged with the detachable panel 50 for holding a state in which the detachable panel 50 is attached to the fixed panel 20. The inner lid holding portion 40e is a curved portion for holding a half-open state of the detachable panel 50. The tapered portion 40f is an inclined portion contacting an edge portion 57c of a concave portion 57 of the detachable panel 50, which will be described later. The apex portion 40g enters an opening 57b of an inner lid 55 that will be described later.

The slider 45 includes a release key portion 45a shown in FIG. 1A and a lever holding portion 45b shown in FIG. 2A. The release key portion 45a is moved by a user to detach the detachable panel 50. The lever holding portion 45b is engaged with the slider holding portion 40c of the lever 40. The release key portion 45a and the lever holding portion 45b are formed integrally with each other.

In FIGS. 1A through 2B, the detachable panel 50 is provided on the front portion of the detachable panel attaching unit 24 to be detachable. Also, a length of the detachable panel 50 in the X-axis direction is nearly the same as a length of the fixed panel 20 in the X-axis direction. As described above, the car navigation device 10 is configured to perform general operations, for example, to display a navigation screen such as maps or route guidance images, or to play CDs or the radio when the detachable panel 50 is appropriately attached to the detachable panel attaching unit 24 of the fixed panel 20.

As shown in FIG. 2A, the detachable panel 50 includes an outer lid 51 and the inner lid 55.

The outer lid 51 is a member forming a part of a front surface of the car navigation device 10. As shown in FIG. 9B, the inner lid 55 has nearly the same outer appearance as that of the outer lid 51, and is fixed to a back surface of the outer lid 51 by an adhesive or the like. Referring to FIG. 2A, the engaging unit 56 that is engaged with the fixed panel 20 is formed on an end portion of the inner lid 55 in −X-axis direction. The engaging unit 56 performs as a location determination unit that restricts the detachable panel 50 from moving in the −X-axis direction when the detachable panel 50 is engaged with the fixed panel 20, and performs as a rotary shaft when the detachable panel 50 rotates. Also, the concave portion 57 that is concavely formed toward the outer lid 51 and has a pressed surface 57d located closer to the outer lid 51 than other parts of the inner lid 55 is formed on the inner lid 55 a little away from a center of FIG. 2A in the +X-axis direction. In FIG. 2A, the opening 57a that is engaged with the hook portion 40d of the lever 40 that will be described later is formed in a side surface at the +X-axis direction of the concave portion 57. Also, an opening 57b for holding is formed in a side surface at the engaging unit 56 side, that is, −X-axis side in FIG. 2A, of the concave portion 57.

Next, a detaching detection mechanism that detects whether the detachable panel 50 is appropriately attached to the fixe panel 20 or not will be described below.

As shown in FIG. 3B, the fixed panel 20 includes a circuit board 27, a switch 28, and a magnetic sensor 29 on a rear portion of the back plate 24a. In addition, a hole 24e through which a boss 58 that will be described later compresses the switch 28 is formed in the back plate 24a.

The circuit board 27 is formed as a plate-shaped printed wiring substrate having a surface perpendicular to an X-Y plane. The switch 28 is electrically connected to the circuit board 27 to detect turning on/turning off states and output a detection signal to a central processing unit (CPU) 100.

As shown in FIG. 3B, the switch 28 may be formed as, for example, a micro switch having a pressing portion 28a. The switch 28 is provided at a location where the pressing portion 28a may be pressed from the hole 24e.

The magnetic sensor 29 is mounted on the circuit board 27. The magnetic sensor 29 may be, for example, a hall device. The magnetic sensor 29 detects a magnetic force and outputs a detection signal representing a magnitude of the detected magnetic force to the CPU 100. Also, the magnetic sensor 29 is provided on a rear portion (−Y-axis direction) of the back plate 24a so as not to be exposed to the outside even if the detachable panel 50 is detached.

Also, as shown in FIG. 3B, the detachable panel 50 includes the boss 58 at a portion corresponding to the switch 28 of the inner lid 55 to press the switch 28. In addition, the detachable panel 50 includes a magnet 59 at a portion corresponding to the magnetic sensor 29, wherein the portion where the magnet 59 is formed is located between the outer lid 51 and the inner lid 55 and cannot be seen from the outside.

In a state where the detachable panel 50 is appropriately attached to the fixed panel 20, the pressing portion 28a of the switch 28 is configured to be pressed by the boss 58. Also, the magnetic sensor 29 is configured to output a detection signal representing that a detected magnetic force is greater than a predetermined value to the CPU 100 when the magnet 59 is located around the magnetic sensor 29, that is, when the detachable panel 50 is appropriately attached to the fixed panel 20 and when the detachable panel 50 is in a half-open state.

Next, a system configuration of the car navigation device 10 will be described below.

Figure 6:
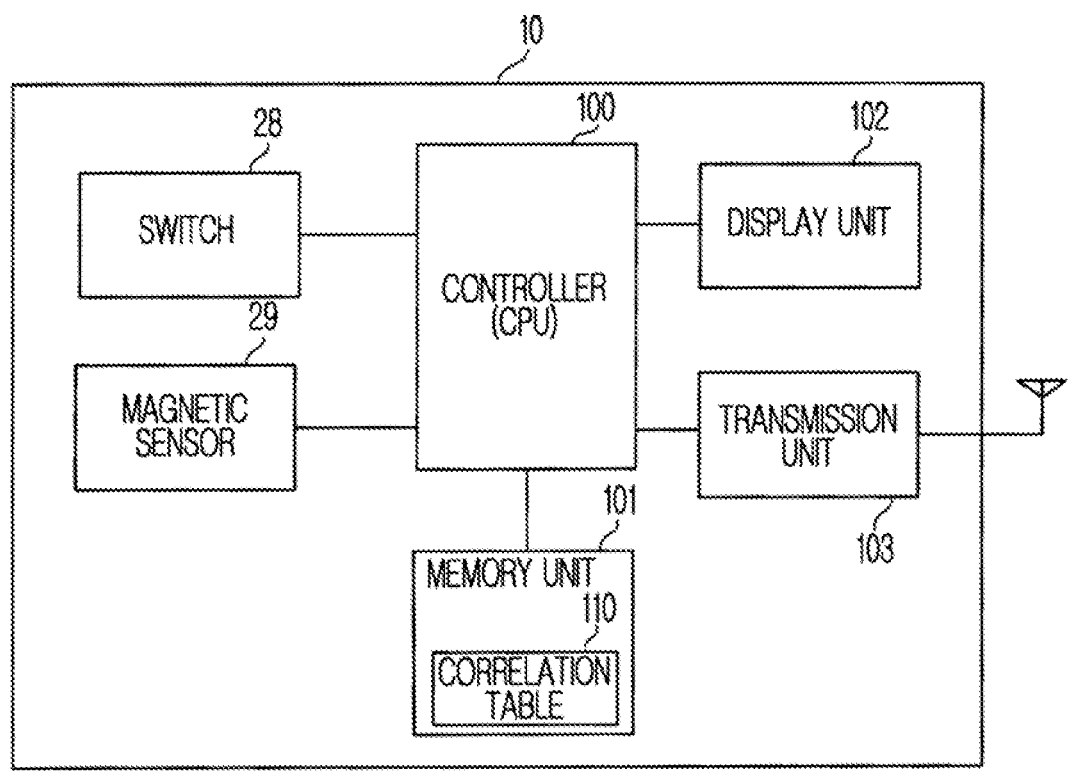
FIG. 6 is a block diagram of a car navigation device according to an embodiment of the present invention.

As shown in FIG. 6, the car navigation device 10 includes the CPU 100, a memory unit 101, the display unit 102, and a transmission unit 103, in addition to the switch 28 and the magnetic sensor 29 described above.

The CPU 100 is a central calculation processor for controlling overall operations of the car navigation device 10, according to various programs stored in the memory unit 101.

Figure 7:
FIG. 7 is a table describing operations of the car navigation device according to the first embodiment of the present invention.

The memory unit 101 includes random access memory (RAM) that temporarily stores calculation results from the CPU 100, and read only memory (ROM) that stores programs or data. As shown in FIG. 6, the memory unit 101 includes a correlation table 110. Referring to FIG. 7, the correlation table 110 includes the detection results output from the switch 28 and the magnetic sensor 29 corresponding to the operations of the car navigation device 10.

The CPU 100 controls operations of the car navigation device 10 based on the detection signals output from the switch 28 and the magnetic sensor 29, with reference to the correlation table 110. In addition, the CPU 100 determines that the detachable panel 50 is appropriately attached to the fixed panel 20, when the pressing portion 28a of the switch 28 is pressed and the detection signal from the magnetic sensor 29 represents that the magnetic force is greater than a predetermined value.

The display unit 102 is attached to the display panel attaching unit 21 shown in FIGS. 1A and 1B. The display unit 102 is formed of, for example, a liquid crystal panel, and displays predetermined characters and images based on signals from the CPU 100. The transmission unit 103 transmits predetermined information, for example, location information received from a GPS satellite, to a predetermined address based on signals from the CPU 100.

Next, operations of the car navigation device 10 configured as described above will be described below.

First, operations of the car navigation device 10 when the detachable panel 50 is attached to the fixed panel 20 will be described below.

As shown in FIGS. 3A and 3B, in a state where the detachable panel 50 is appropriately attached to the fixed panel 20, when the switch 28 is pressed by the boss 58, the switch 28 outputs a detection signal to the CPU 100, and at the same time, the magnetic sensor 29 detects the magnetic force of the magnet 59 and outputs a detection signal to the CPU 100. The CPU 100 receives the detection signal from the switch 28 (switch turned-on) and receives the detection signal representing that the magnetic force is greater than a predetermined value from the magnetic sensor 29, and thus, the CPU 100 determines that the detachable panel 50 is appropriately attached to the fixed panel 20 (attaching state). Here, the CPU 100 is in a general operation state in which predetermined functions of the car navigation device 10 are allowed to be used, with reference to the correlation table 110 shown in FIG. 7. For example, the CPU 100 may allow the car navigation device 10 to display navigation information such as maps or route guidance images or to play CDs or the radio, by pushing a push button (not shown).

Next, operations of the car navigation device 10 when the detachable panel 50 is detached from the fixed panel 20 and is held in a half-open state, in which the detachable panel 50 is rotated at a predetermined angle, will be described below.

Figure 4A:
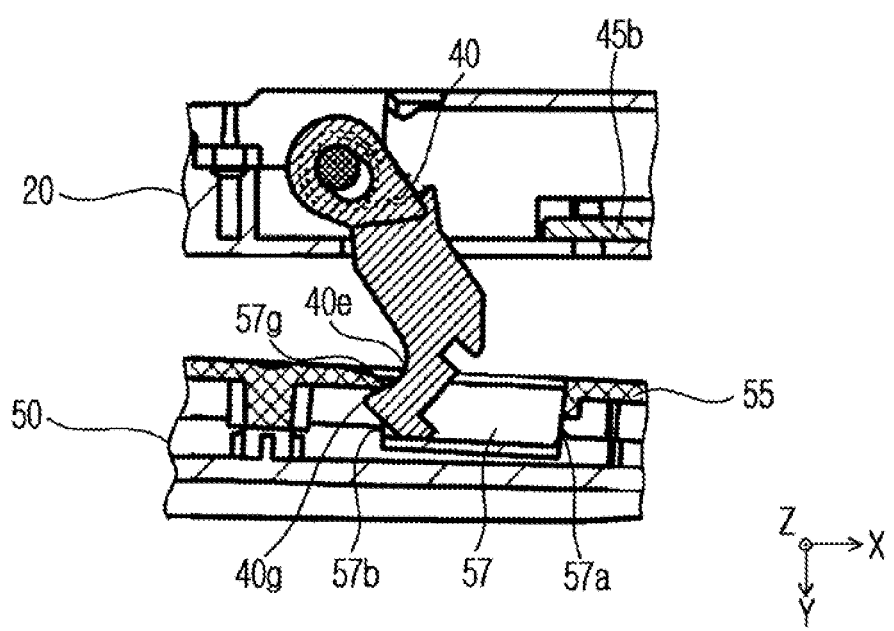
FIG. 4A is an enlarged view of a part around the lever when the detaching panel is extruded by the lever in the car navigation system according to the first embodiment of the present invention.

As shown in FIG. 2A, when the release key portion 45a is moved to a right side of FIG. 1A (X-axis direction) in a state where the detachable panel 50 is attached to the fixed panel 20, the lever holding portion 45b that is integrally formed with the release key portion 45a is moved to the right side (X-axis direction) so as to release the engagement between the lever holding portion 45b and the slider holding portion 40c of the lever 40. Accordingly, the lever 40 is rotated based on the rotary shaft 24d in a clockwise direction of FIG. 2A by the elastic supporting force of the twisted coil spring 41, thereby pressing the pressed surface 57d of the detachable panel 50. In addition, the detachable panel 50 is rotated based on the engaging unit 56 in the clockwise direction of FIG. 2A. After that, as shown in FIG. 4A, the apex portion 40g of the inner lid holding portion 40e of the lever 40 enters the opening 57b of the inner lid 55. In addition, the inner lid holding portion 40e is engaged with the edge portion 57g of the inner lid 55. Accordingly, the detachable panel 50 is elastically supported by the lever 40 toward the engaging unit 56 shown in FIG. 2A, and thus, the detachable panel 50 is held in the half-open state in which the detachable panel 50 is rotated based on the engaging unit 56 at a predetermined angle in the clockwise direction of FIG. 2A.

Here, as shown in FIG. 4B, since the switch 28 is not pressed by the boss 58, the switch 28 does not output a detection signal to the CPU 100. Meanwhile, the magnetic sensor 29 detects a magnetic force of the magnet 59 and outputs a detection signal to the CPU 100. The CPU 100 does not receive the detection signal from the switch 28 (switch turned-off) and receives the detection signal representing that the magnetic force is greater than a predetermined value from the magnetic sensor 29, and thus, the CPU 100 determines that the detachable panel 50 is in the half-open state. Here, the CPU 100 restricts allowable functions of the car navigation device 10 to be less than those of the general operation state, with reference to the correlation table 110 shown in FIG. 7. For example, the CPU 100 does not display the navigation information such as maps or route guidance images and does not play CDs and the radio, even when the pushing button (not shown) is pushed. Otherwise, the CPU 100 can make the car navigation device 10 be in an unavailable state. If the detachable panel 50 is in the half-open state, the CPU 100, for example, may desirably display a message such as "please completely attach the detachable panel" on the display unit 102 in order to prompt the appropriate attachment of the detachable panel 50.

Next, operations of the car navigation device 10 when the detachable panel 50 is completely detached from the fixed panel 20 will be described below.

Figure 5A:
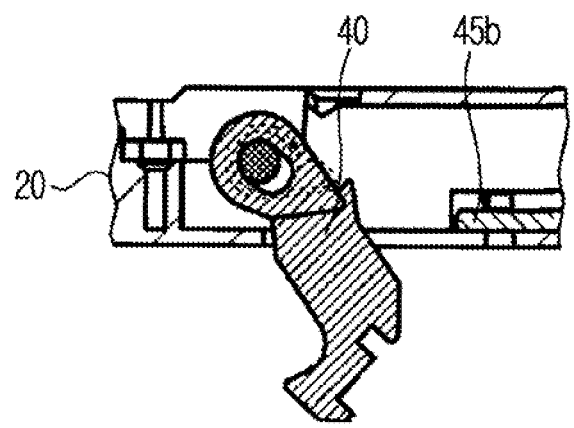
FIGS. 5A and 5B are enlarged views of a peripheral portion of the lever showing a state where the detachable panel is separated from the lever according to the first embodiment of the present invention.
Figure 5A:
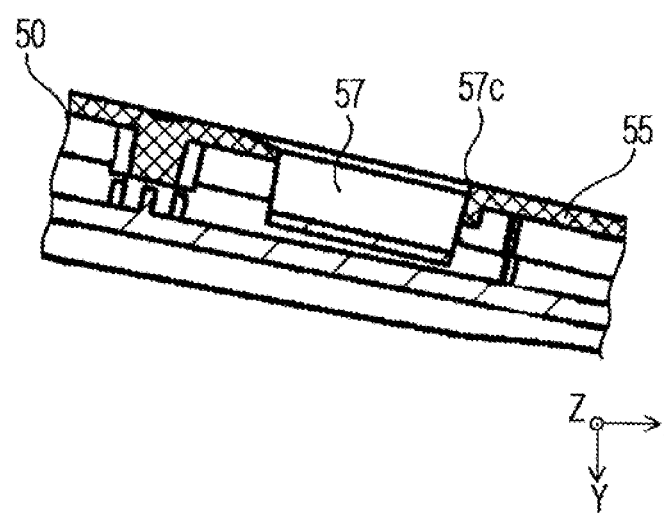

In the state shown in FIG. 4A, the detachable panel 50 is additionally rotated based on the engaging unit 56 in the clockwise direction of FIG. 2A. Then, the lever 40 is slightly rotated in a counter-clockwise direction, and at the same time, the edge portion 57g of the inner lid 55 rises over the apex portion 40g of the lever 40. Accordingly, as shown in FIG. 5A, the detachable panel 50 is separated from the lever 40. In addition, by unfixing the engaging unit 56 of the detachable panel 50 from the slit 24b of the fixed panel 20, the detachable panel 50 may be completely detached from the fixed panel 20.

Here, since the detachable panel 50 and the fixed panel 20 are separated from each other, the switch 28 is not pressed by the boss 58 and does not output a detection signal to the CPU 100. Accordingly, the CPU 100 does not receive the detection signal from the switch 28 (switch turned-off). Also, the magnetic sensor 29 detects the magnetic force of the magnet 59;

however, since the detachable panel 50 and the fixed panel 20 are separated from each other, the magnetic sensor 29 outputs a detection signal representing that the magnetic force is equal to or less than a predetermined value. Thus, the CPU 100 determines that the detachable panel 50 is detached from the fixed panel 20. Here, the CPU 100 restricts available functions of the car navigation device 10 to be less than those of the general operation state, with reference to the correlation table 110 shown in FIG. 7. For example, the CPU 100 does not display the navigation information such as the maps or route guidance images, and does not play CDs or the radio even if the pushing button (not shown) is pushed.

Also, in a state shown in FIG. 5A, if the CPU 100 receives a detection signal only from the switch 28 that is visible from the outside, the CPU 100 receives the detection signal from the switch 28 (switch turned-on) and receives a detection signal representing that the magnetic force is equal to or less than a predetermined value from the magnetic sensor 29. Accordingly, the CPU 100 determines that someone presses the switch 28 without using the detachable panel 50. Here, the CPU 100 restricts the available functions of the or navigation device 10 to be less than those of the general operation state, with reference to the correlation table 110 shown in FIG. 7. For example, the CPU 100 does not display the navigation information such as maps or route guidance images and does not play CDs and the radio, even when the pushing button (not shown) is pushed. Otherwise, the CPU 100 can make the car navigation device 10 be in an unavailable state. Also, the CPU 100 displays an image showing a warning message, for example, preventing theft on the display unit 102. In addition, the CPU 100 makes the transmission unit 103 transmit location information representing the location of the car navigation device 10 to a certain address. The certain address may be an address or the like registered by a user in advance.

Next, operations of the car navigation device 10 when the detached detachable panel 50 is attached to the fixed panel 20 will be described below.

Figure 5B:
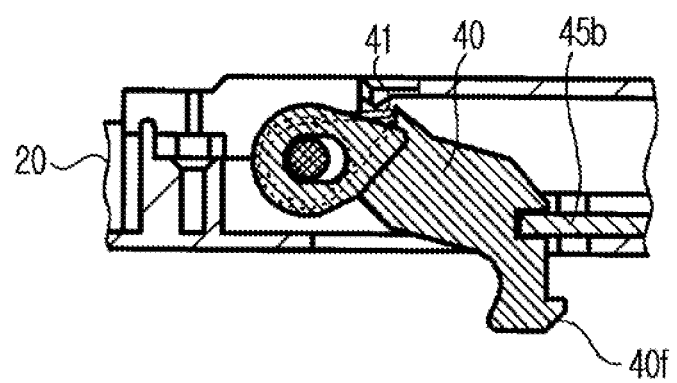
Figure 5B:
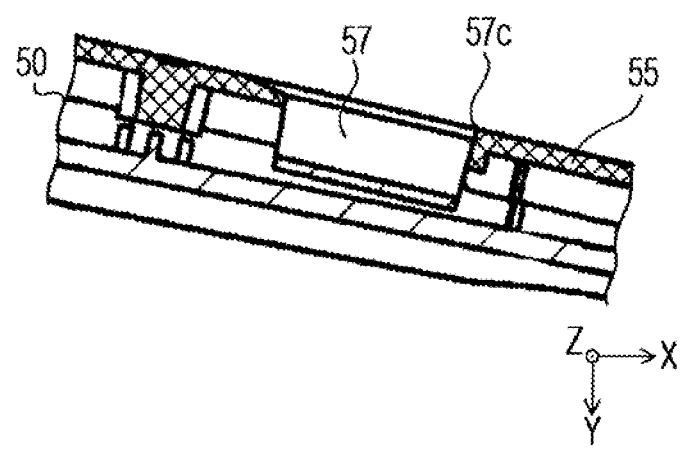

As shown in FIG. 5B, the lever 40 is engaged with the lever holding portion 45b in a state where the lever 40 is rotated against the elastic force of the twisted coil spring 41 in a counter-clockwise direction of FIG. 5B. In addition, the engaging unit 56 of the detachable panel 50 shown in FIG. 2A is engaged with the slit 24b of the fixed panel 20, and after that, the detachable panel 50 is rotated based on the engaging unit 56 in the counter-clockwise direction of FIG. 2A. Accordingly, the edge portion 57c of the inner lid 55 shown in FIG. 5B contacts the tapered unit 40f of the lever 40.

When the detachable panel 50 is additionally rotated in the counter-clockwise direction, the tapered unit 40f receives a force applied from the edge portion 57c toward a left side of FIG. 5B (−X-axis direction). Accordingly, the lever 40 in which the elongated hole 40a is formed is moved toward the left side of FIG. 5B (−X-axis direction) against the elastic supporting force of the twisted coil spring 41. In addition, when the detachable panel 50 is additionally rotated in the counter-clockwise direction so that the edge portion 57c of the inner lid 55 rises over the tapered unit 40f, the lever 40 is moved to a right side of FIG. 5B (+X-axis direction) by the elastic supporting force of the twisted coil spring 41. Here, as shown in FIG. 3A, the hook portion 40d of the lever 40 is engaged with the opening 57a. Accordingly, the detachable panel 50 is locked by the lever 40.

At this time, as described above, the CPU 100 receives a detection signal from the switch 28 (switch turned-on) and receives a detection signal representing that the magnetic force is greater than a predetermined value from the magnetic sensor 29, and thus, the CPU 100 determines that the detachable panel 50 is appropriately attached to the fixed panel 20 (attached state). Here, the CPU 100 enters the general operation state in which predetermined functions of the car navigation device 10 are available, with reference to the correlation table 110 shown in FIG. 7. For example, the CPU 100 may display navigation information such as maps or route guidance images or play CDs or the radio, when the pushing button (not shown) is pushed.

As described above, according to the car navigation device 10 of the present embodiment, operations of the car navigation device 10 may be restricted only by detaching the detachable panel 50, and thus, a car navigation device having high efficiency in preventing theft with a simple structure may be provided. Also, the car navigation device 10 includes a sensor that is not exposed to outside so that a thief finds it hard to discover the sensor, thereby further improving an anti-theft performance.

Also, the engagement between the lever 40 and the detachable panel 50 can be released only by manipulating the slider 45, and at the same time, the lever 40 rotates the detachable panel 50, and thus, the detachable panel 50 may be detached easily. In addition, since the inner lid holding portion 40e of the lever 40 is engaged with the opening 57b of the inner lid 55 so that the detachable panel 50 can be held in the half-open state, the detachable panel 50 can be detached easily. Also, the elongated hole 40a is formed in the lever 40 so that the lever 40 may move to left and right sides, and thus, the detachable panel 50 can be attached easily even if the lever 40 is held by the slider 45 in advance.

Second Embodiment

Next, the car navigation device 10 according to a second embodiment of the present invention will be described below with reference to FIGS. 8A through 10B.

The car navigation device 10 of the present embodiment basically has the same structure as that of the car navigation device 10 according to the first embodiment. The car navigation device 10 of the present embodiment is different from that of the first embodiment in that the detachable panel 50 is opened in a state where the lever 40 is engaged with the inner lid 55 of the detachable panel 50. Also, like reference numerals denote the same elements as those of the car navigation device 10 according to the first embodiment, and detailed descriptions thereof are emitted.

Figure 8A:
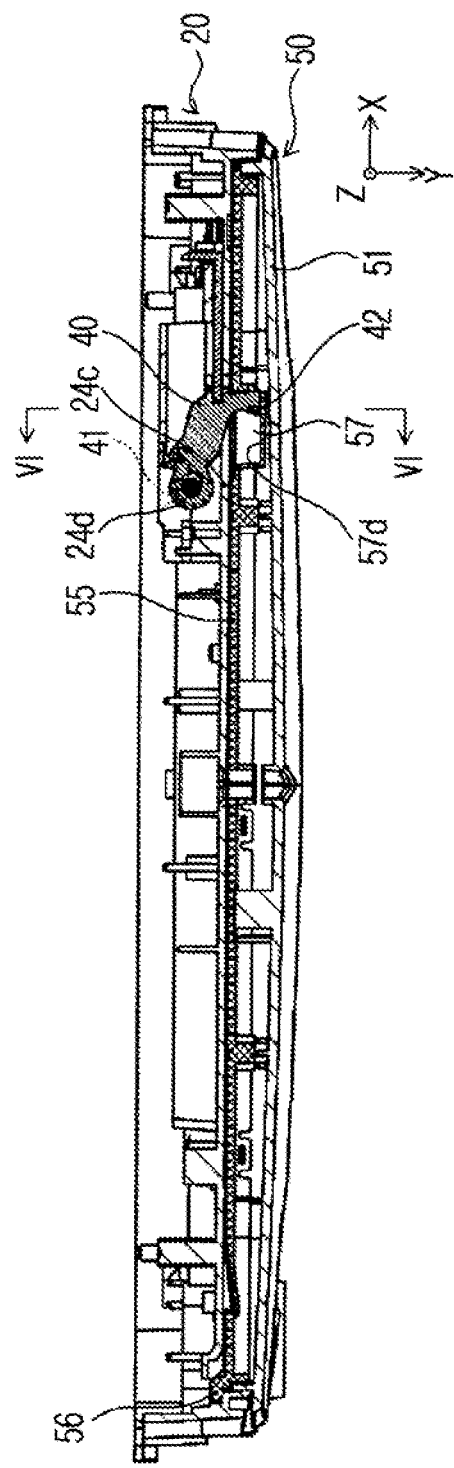
FIG. 8A is a cross-sectional view of a car navigation device taken along line II-II of FIG. 1 according to a second embodiment of the present invention.
Figure 8B:
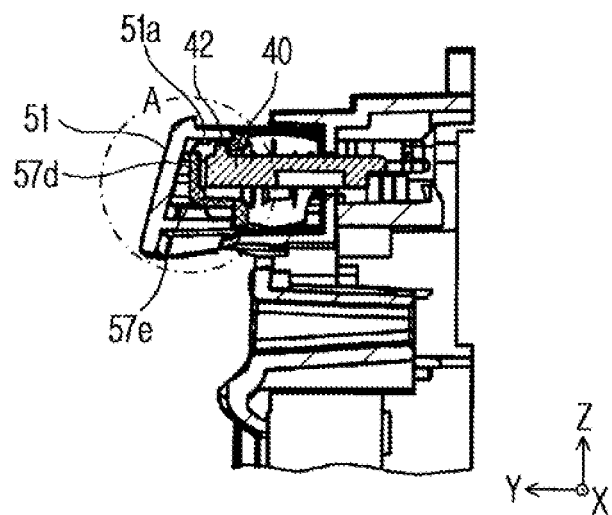
FIG. 8B is a cross-sectional view of the car navigation device taken along line VI-VI of FIG. 8A.
Figure 8C:
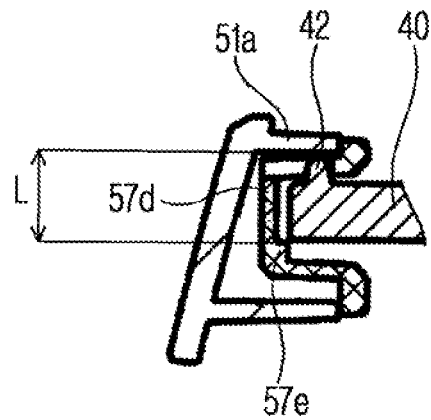
FIG. 8C is an enlarged view of a portion A shown in FIG. 8B.

As shown in FIGS. 8A through 8C, the lever 40 is the same as the lever 40 according to the first embodiment except that a convex portion 42 is formed on an upper surface thereof. Also, the upper surface of the lever 40 contacts an upper end of the hole 24c of the fixed panel 20 due to the elastic force of the twisted coil spring 41.

Also, as shown in FIGS. 8B and 8C, the outer lid 51 of the detachable panel 50 has a cover portion 51a on an upper portion thereof. A stepped portion 57e protruding from the pressed surface 57d backwards, that is, −Y-axis direction, is formed on the pressed surface 57d of the concave portion 57 formed in the inner lid 55. The stepped portion 57e is configured so that a length L from an upper surface of the stepped portion 57e to a lower surface of the cover portion 51a of the outer lid 51 is slightly greater than a sum of a thickness of the lever 40 and a height of the convex portion 42.

Figure 9A:
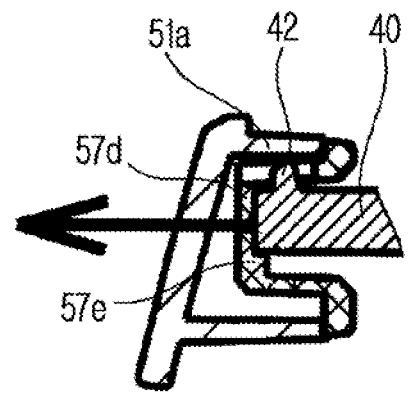
FIG. 9A is an enlarged view of the portion A of FIG. 8B when a detachable panel is extruded by a lever according to the second embodiment of the present invention.
Figure 9B:
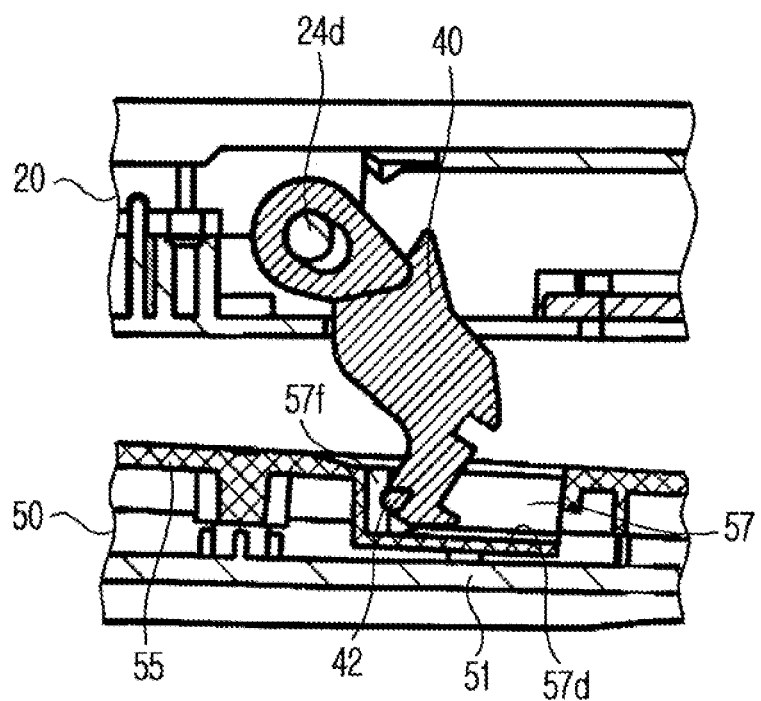
FIG. 9B is an enlarged view of a part around the lever when the detachable panel is extruded by the lever.

Accordingly, as shown in FIG. 9A, while the lever 40 compresses the pressed surface 57d, the lever 40 is engaged between the upper surface of the stepped portion 57e and the cover portion 51a of the outer lid 51.

Figure 10B:
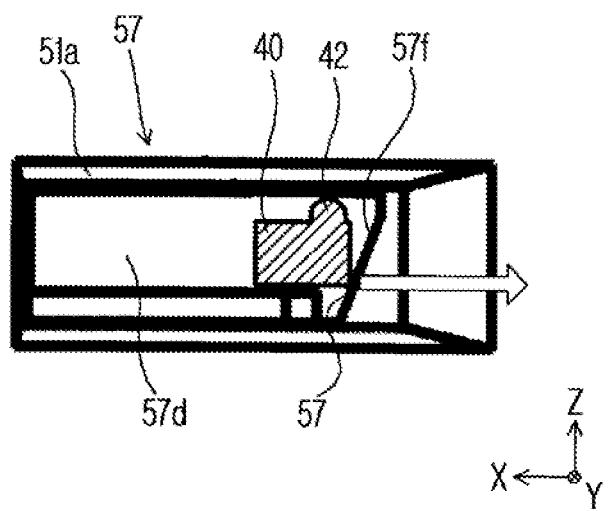
FIG. 10B is an enlarged view of a portion B shown in FIG. 10A.

Also, as shown in FIGS. 10A and 10B where the detachable panel 50 is seen from a back surface thereof, a side surface in the −X-axis direction of the concave portion 57 formed in the inner lid 55 forms a contacting surface 57f that contacts the lever 40 when the lever 40 is rotated. The contacting surface 57f is formed as an inclined surface facing a location between +X-axis direction and +Z-axis direction.

Accordingly, during when the lever 40 presses the contacting surface 57f in the −X-axis direction (direction denoted by an arrow of FIG. 10B), the lever 40 presses the inner lid 55 downwards.

Next, operations of detaching the detachable panel 50 from the fixed panel 20 will be described below. Also, as described above, since the car navigation device 10 of the present embodiment basically has the same structure as that of the first embodiment, the description may be provided with reference to FIGS. 1A and 2A.

First, as shown in FIGS. 8A through 8C, when the release key portion 45a of FIG. 1A is moved to a right side of FIG. 1A in a state where the detachable panel 50 is attached onto the fixed panel 20, the engagement between the lever holding portion 45b and the slider holding portion 40c of the lever 40 shown in FIG. 2A is released, like in the first embodiment. Accordingly, the lever 40 is rotated based on the rotary shaft 24d in a clockwise direction of FIG. 8A by the elastic supporting force of the twisted coil spring 41 so as to compress the pressed surface 57d of the detachable panel 50. Here, the lever 40 is engaged between the upper surface of the stepped portion 57e and the cover portion 51a of the outer lid 51. In addition, the detachable panel 50 is rotated based on the engaging unit 56 in the clockwise direction of FIG. 8A.

When the lever 40 and the detachable panel 50 are additionally rotated, as shown in FIGS. 9B and 10B, the lever 40 contacts the contacting surface 57f of the concave portion 57 so that the inner lid 55 is forced to descend downward. Accordingly, the convex portion 42 of the lever 40 is subjected to a force downward by the lower surface of the cover portion 51a of the outer lid 51.

As described above, the lever 40 is engaged between the upper surface of the stepped portion 57e and the cover portion 51a of the outer lid 51 when it is rotated in the clockwise direction of FIG. 8A. Accordingly, the detachable panel 50 is rotated perpendicular to the rotary shaft 24d, that is, in parallel with an X-Y plane, without rattling upward. Also, when the lever 40 is rotated to compress the contacting surface 57f, the convex portion 42 of the lever 40 is subjected to a force downward by the lower surface of the cover portion 51a of the outer lid 51, and accordingly, the detachable panel 50 is firmly held in the half-open state without rattling upward. Also, as shown in FIG. 8C, since the engagement between the upper surface of the stepped portion 57e and the cover portion 51a of the outer lid 51 is released, the detachable panel 50 may be easily detached from the fixed panel 20.

While this invention has been particularly shown and described with reference to exemplary embodiments thereof, it will be understood by those skilled in the art that various changes in form and details may be made therein without departing from the spirit and scope of the invention as defined by the appended claims.

For example, a car navigation device is described as an example of an electronic device in the above embodiments; however, the present invention is not limited thereto. For example, the electronic device may be a car audio device or a car radio.

For example, the switch is used to detect whether the detachable panel 50 is appropriately attached to the fixed panel 20 or not in the above embodiments; however, the present invention is not limited thereto. In addition, other sensors, for example, an electrostatic capacity sensor, a pressure sensor, and the like, may be used, provided that the sensor is a contact type sensor.

Also, the magnetic sensor is a hall device in the above embodiments; however, the present invention is not limited thereto. For example, the magnetic sensor may be a magneto-resistance device.

In addition, the magnetic sensor is used to detect whether the detachable panel 50 is attached appropriately to the fixed panel 20 or not in the above embodiments, however, the present invention is not limited thereto. A non-contact type sensor, for example, an optical sensor, may be used.

Also, if the car navigation device is configured to restrict functions when at least one of a first sensor (for example, the switch 28) and a second sensor (for example, the magnetic sensor) detects that the detachable panel is detached from the fixed panel, an anti-theft effect can be obtained.

According to the present invention, an electronic device having a high performance in preventing theft with a simple structure can be provided.

What is claimed is:

1. An electronic device having a plurality of functions, the electronic device comprising:
    a fixed panel;
    a detachable panel which is attached to or detached from the fixed panel;
    a first sensor which detects detaching of the detachable panel from the fixed panel;
    a second sensor which detects detaching of the detachable panel from the fixed panel; and
    a controller which restricts some of the plurality of functions when at least one of the first sensor and the second sensor detects that the detachable panel is detached from the fixed panel,
    wherein the first sensor is formed of a contact type sensor to detect that the detachable panel is attached to the fixed panel when a part of the detachable panel contacts the first sensor, and
    the second sensor is formed of a non-contact type sensor to detect that the detachable panel is attached to the fixed panel when the detachable panel is located around the second sensor.

2. The electronic device of claim 1, wherein the second sensor is provided in the fixed panel.

3. The electronic device of claim 1, further comprising a display unit,
    wherein when one of the first sensor and the second sensor detects that the detachable panel is attached to the fixed panel and the other does not detect that the detachable panel is attached to the fixed panel, the controller displays a predetermined image on the display unit.

4. The electronic device of claim 1, further comprising a transmission unit,
    wherein when one of the first sensor and the second sensor detects that the detachable panel is attached to the fixed panel and the other does not detect that the detachable panel is attached to the fixed panel, the controller transmits predetermined information from the transmission unit.

5. The electronic device of claim 1, wherein a rotary shaft is formed on the fixed panel, the fixed panel comprises a lever including a first engaging unit that is engaged with the detachable panel and rotating based on the rotary shaft between a first location at the fixed panel side and a second location at the detachable panel side, and
    the detachable panel is engaged with the first engaging unit of the lever to be attached when the lever is located to the fixed panel at the first location and is detached from the fixed panel by being pressed by the lever when the lever is rotated to move to the second location.

6. The electronic device of claim 5, wherein the detachable panel is provided to be rotated based on an end of the detachable panel when the end of the detachable panel is engaged with the fixed panel,
the lever comprises a second engaging unit having a concave shape, which faces the end of the detachable panel when the lever is located at the second location, and
by the second engaging unit's pressing the detachable panel toward the end when the lever is located at the second location, the detachable panel is held in a state where the detachable panel is rotated at a predetermined angle based on the end.

7. The electronic device of claim 5, wherein the detachable panel includes a pressed portion that is pressed by the lever when the lever is rotated to move to the second location, and the lever is engaged with the pressed portion while moving from the first location to the second location.

8. The electronic device of claim 1, wherein the first sensor is visible from the outside, and the second sensor is invisible from the outside.

9. The electronic device of claim 1, wherein the fixed panel is capable of holding the detachable panel, in a half-open state where the first sensor does not detect that the detachable panel is detached from the fixed panel and the second sensor detects that the detachable panel is detached from the fixed panel.

10. An electronic device having a plurality of functions, the electronic device comprising:
a fixed panel;
a detachable panel which is attached to or detached from the fixed panel;
a first sensor which detects detaching of the detachable panel from the fixed panel;
a second sensor which detects detaching of the detachable panel from the fixed panel;
a controller which restricts some of the plurality of functions when at least one of the first sensor and the second sensor detects that the detachable panel is detached from the fixed panel, and
a transmission unit,
wherein when one of the first sensor and the second sensor detects that the detachable panel is attached to the fixed panel and the other does not detect that the detachable panel is attached to the fixed panel, the controller transmits predetermined information from the transmission unit.

11. The electronic device of claim 10, wherein the second sensor is provided in the fixed panel.

12. The electronic device of claim 10, further comprising a display unit,
wherein when one of the first sensor and the second sensor detects that the detachable panel is attached to the fixed panel and the other does not detect that the detachable panel is attached to the fixed panel, the controller displays a predetermined image on the display unit.

13. The electronic device of claim 10, wherein a rotary shaft is formed on the fixed panel, the fixed panel comprises a lever including a first engaging unit that is engaged with the detachable panel and rotating based on the rotary shaft between a first location at the fixed panel side and a second location at the detachable panel side, and
the detachable panel is engaged with the first engaging unit of the lever to be attached when the lever is located to the fixed panel at the first location and is detached from the fixed panel by being pressed by the lever when the lever is rotated to move to the second location.

14. The electronic device of claim 13, wherein the detachable panel is provided to be rotated based on an end of the detachable panel when the end of the detachable panel is engaged with the fixed panel,
the lever comprises a second engaging unit having a concave shape, which faces the end of the detachable panel when the lever is located at the second location, and
by the second engaging unit's pressing the detachable panel toward the end when the lever is located at the second location, the detachable panel is held in a state where the detachable panel is rotated at a predetermined angle based on the end.

15. The electronic device of claim 13, wherein the detachable panel includes a pressed portion that is pressed by the lever when the lever is rotated to move to the second location, and the lever is engaged with the pressed portion while moving from the first location to the second location.

16. The electronic device of claim 10, wherein the first sensor is visible from the outside, and the second sensor is invisible from the outside.

17. The electronic device of claim 10, wherein the fixed panel is capable of holding the detachable panel, in a half-open state where the first sensor does not detect that the detachable panel is detached from the fixed panel and the second sensor detects that the detachable panel is detached from the fixed panel.

* * * * *